United States Patent [19]
DeLair et al.

[11] Patent Number: 5,737,532
[45] Date of Patent: Apr. 7, 1998

[54] SYSTEM AND TECHNIQUE FOR ACCESSING STORED AUDIO AND VISUAL INFORMATION FROM A DATABASE

[75] Inventors: Charles M. DeLair; Grant Schmieder; Mark S. Sprague; Kenneth W. Virgil; Anthony F. Zucco, all of Tucson, Ariz.

[73] Assignee: Hughes Missile Systems Company, Los Angeles, Calif.

[21] Appl. No.: 469,964

[22] Filed: Jun. 6, 1995

[51] Int. Cl.$^6$ ................................................. G06F 17/10
[52] U.S. Cl. ................ 395/200.49; 395/601; 364/283.1; 348/12
[58] Field of Search ................ 395/200.09, 600, 395/601, 602, 603, 610, 200.47, 200.49; 364/419.19, 514 A, 282.1–282.4; 348/7, 12, 5.2

[56] References Cited

U.S. PATENT DOCUMENTS 5,241,671  8/1993  Reed et al. .................... 395/600

*Primary Examiner*—John K. Peng
*Assistant Examiner*—Nathan J. Flynn
*Attorney, Agent, or Firm*—Charles D. Brown; Michael W. Sales; Wanda K. Denson-Low

[57] ABSTRACT

A method and system for providing video on demand from a database of textual information. In accordance with the inventive method, video data is stored on an addressable medium. The addresses for video segments are stored for retrieval when corresponding textual information is accessed in the database. In a particular embodiment, the addresses are stored in a lookup table which is read whenever a section of textual data is accessed. When the table indicates that video is available, corresponding to the text being viewed, an icon is displayed on the screen. When the video option is exercised, the address for the video segment is retrieved from the table and used to access the video storage medium. Video from the medium is then displayed interactively. The invention thus provides a system and technique for providing access to live action video at appropriate locations in a computer database.

10 Claims, 4 Drawing Sheets

SYSTEM AND TECHNIQUE FOR ACCESSING STORED AUDIO AND VISUAL INFORMATION FROM A DATABASE

BACKGROUND OF THE INVENTION

1. Field of the Invention

The present invention relates to database and multimedia systems and methods. More specifically, the present invention relates to databases and multimedia systems used in connection with logistic support and analysis.

2. Description of the Related Art

The Department of Defense (DoD) publishes Military Standards ("MIL-STDs") as a means of standardizing the way, means and manner of doing business. When doing business with DoD, any MIL-STDs referring to that type of business must be adhered to.

The U.S. government has established a relational database containing information relating to various military logistical matters. This is known as the MIL-STD-1388-2B Logistical Support Analysis Record (LSAR) database. Vendors who desire to provide computer tracking of their products are required to comply with the "MIL-SPECS" in the construction of databases.

Two MIL-SPECS, in particular, relate to the performance of maintenance tasks and thereby minimize the need to resort to cumbersome technical manuals.

MIL-STD-1388-1A provides instruction to a logistic organization with respect to what information must be provided. For hardware to be delivered by a contractor, this includes, by way of example, information relating to the reliability, maintainability, failure rate, transportation requirements, and facility requirements for the hardware.

As of Jun. 6, 1995 relates to how the data collected is to be stored and reported to the Government. As of Jun. 6, 1995 MIL-STD-1388-2B establishes a standard medium to systematically record, store, process and report data gathered during the logistics and engineering front-end analysis process. This data is required by the elements of support to develop their logistics supportability products. The MIL-STD defines a file format which permits orderly and cost-effective input, storage, analysis, and retrieval of logistical support analysis (LSA) data and LSA-related information. As of Jun. 6, 1995 MIL-STD-1388-2B defines a relational database having several tables in which general narratives are stored. Table CC contains detailed technical task narratives.

Unfortunately, although it is believed that live action video would substantially facilitate the installation, service and repair of sophisticated military hardware, these narratives do not generally provide live action video as to how to perform the numerous maintenance tasks required.

Thus, a need exists in the art for a system and technique for providing access to live action video at appropriate locations in a computer database.

SUMMARY OF THE INVENTION

The need in the art is addressed by the present invention which provides a method and system for providing video on demand from a database of textual information. In accordance with the inventive method, video data is stored on an addressable medium. The addresses for video segments are stored for retrieval when corresponding textual information is accessed in the database. In a particular embodiment, the addresses are stored in a lookup table which is read whenever a section of textual data is accessed. When the table indicates that video is available, corresponding to the text being viewed, an icon is displayed on the screen. When the video option is exercised, the address for the video segment is retrieved from the table and used to access the video storage medium. Video from the medium is then displayed interactively.

The invention thus provides a system and technique for providing access to live action video at appropriate locations in a computer database.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
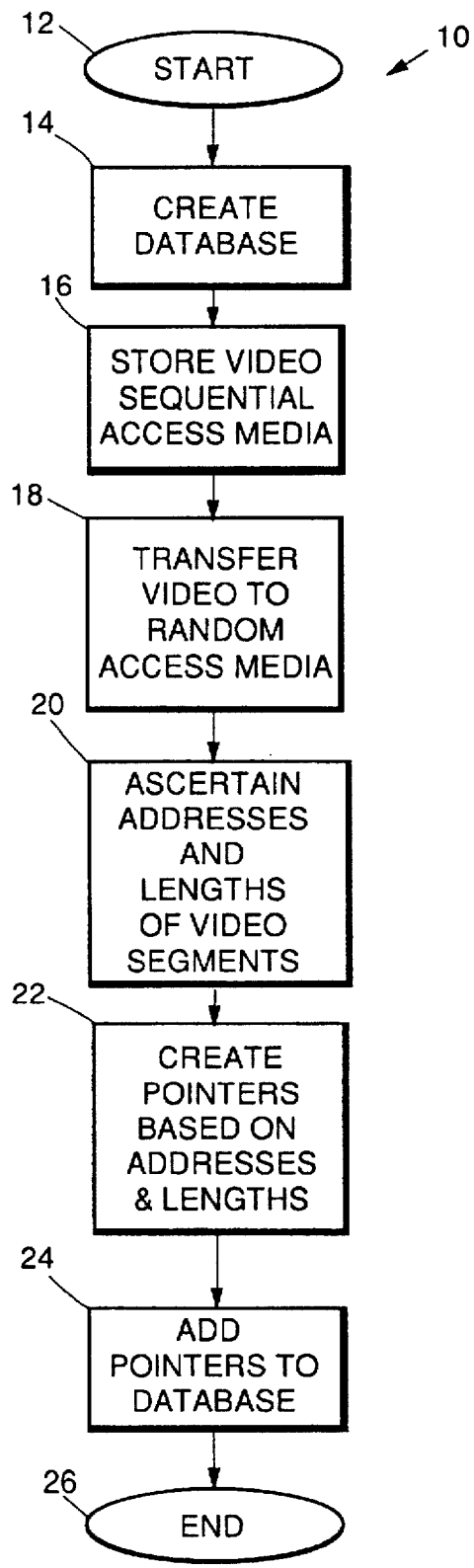
FIG. 1 is a flow diagram of the set up procedure of the method of the present invention.

FIG. 1 is a flow diagram 10 of the set up procedure of the method of the present invention. The first step 14 in the process 10 involves the creation of the database of information. In the illustrative embodiment, the database is set up under the guidelines of as of Jun. 6, 1995 MIL-STD-1388-2B. As of Jun. 6, 1995 MIL-STD-1388-2B defines a relational database having several tables in which general narratives are stored. A specific table, Table CC, contains detailed technical task narratives.

Figure 1A:
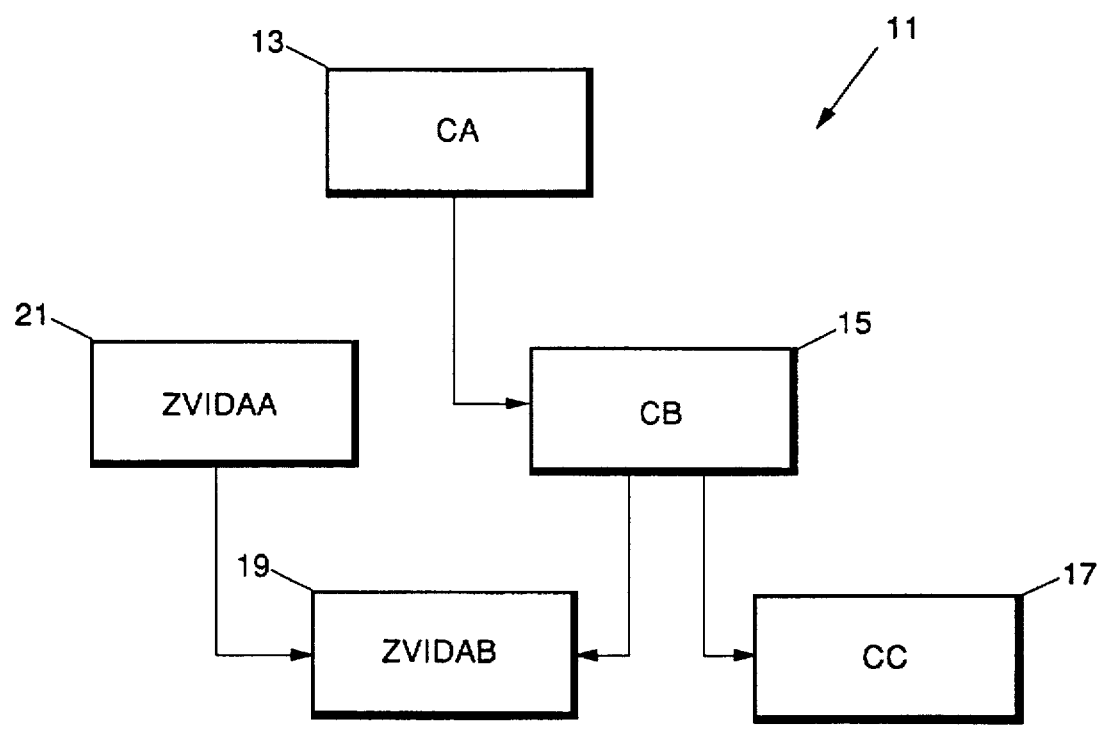
FIG. 1A is a diagram which illustrates the relationship between several tables utilized in the as of Jun. 6, 1995 MIL-STD-1388-2B relational database.

FIG. 1A is a diagram 11 which illustrates the relationship between several tables utilized in the as of Jun. 6, 1995 MIL-STD-1388-2B relational database. The tables are required for documentation of task analysis and personnel and support requirement data. Information in the tables must be presented in sufficient detail to define task time, skills, tools, support equipment, facilities and supply support requirements. For this process, we are concerned with only 3 of the 11 tables required by as of Jun. 6, 1995 MIL-STD-1388-2B, Tables CA, CB and CC, (13, 15, and 17 respectively).

Table CA (13) defines the task requirement. This table contains task level information such as mean elapsed time, task frequency, task criticality, task identification and task code. It also contains information about personnel and training aspects of the task. Table CA is the primary table for task information and entry must be made in this table before any subordinate tables can be updated with information pertaining to a specific task.

Table CB (15) defines the subtask requirement. That is, Table CB is subordinate to Table CA and identifies the subtask associated with a task. This table contains data related to the subtask level such as work area code and mean minute elapsed time. All task narrative will be written at the subtask level, then rolled into the task level.

Table CC (17) defines the sequential subtask description. That is, Table CC is subordinate to Table CB and contains the subtask requirement. This table contains the sequential task narrative entered at the subtask level. The narrative will be entered in a step-by-step basis in order to document all subtasks required to perform the task under analysis. Subtasks should be detailed and sequenced to eliminate possibilities of technically incorrect procedures.

In the illustrative application, the task narratives provide detailed step-by-step instructions on the performance of maintenance operations on sophisticated electrical and mechanical systems.

Although, in many applications, video information would be of substantial utility, the narratives generally only provide information in the form of text. Accordingly, a particularly novel and advantageous feature of the invention is the provision of live action video in connection with the task narratives of a as of Jun. 6, 1995 MIL-STD-1388-2B database.

In accordance with the invention, at step 16, video information relevant to selected task narratives is stored on video tape or other appropriate (typically sequential access) medium. Next, at step 18, the video tape is transferred to a random access medium such as a compact disc (in an analog implementation) or computer hard disk (in a digital implementation). In any event, the address and length of each video segment (in terms of frame numbers and numbers of frames in the analog implementation and disk, track, sector and number of bytes in the digital implementation) is ascertained (at step 20) and used to create pointers into the database (at step 22). At step 24, the pointers are added to the database so that when associated task narratives are displayed, the appropriate video segment may be viewed interactively. In the best mode, the pointers are stored in a table such as Table CC shown in FIG. 1A. This table is read when each task narrative is selected in order to provide an indication of the availability and location of video for a task without necessitating tags in the database.

Figure 2:
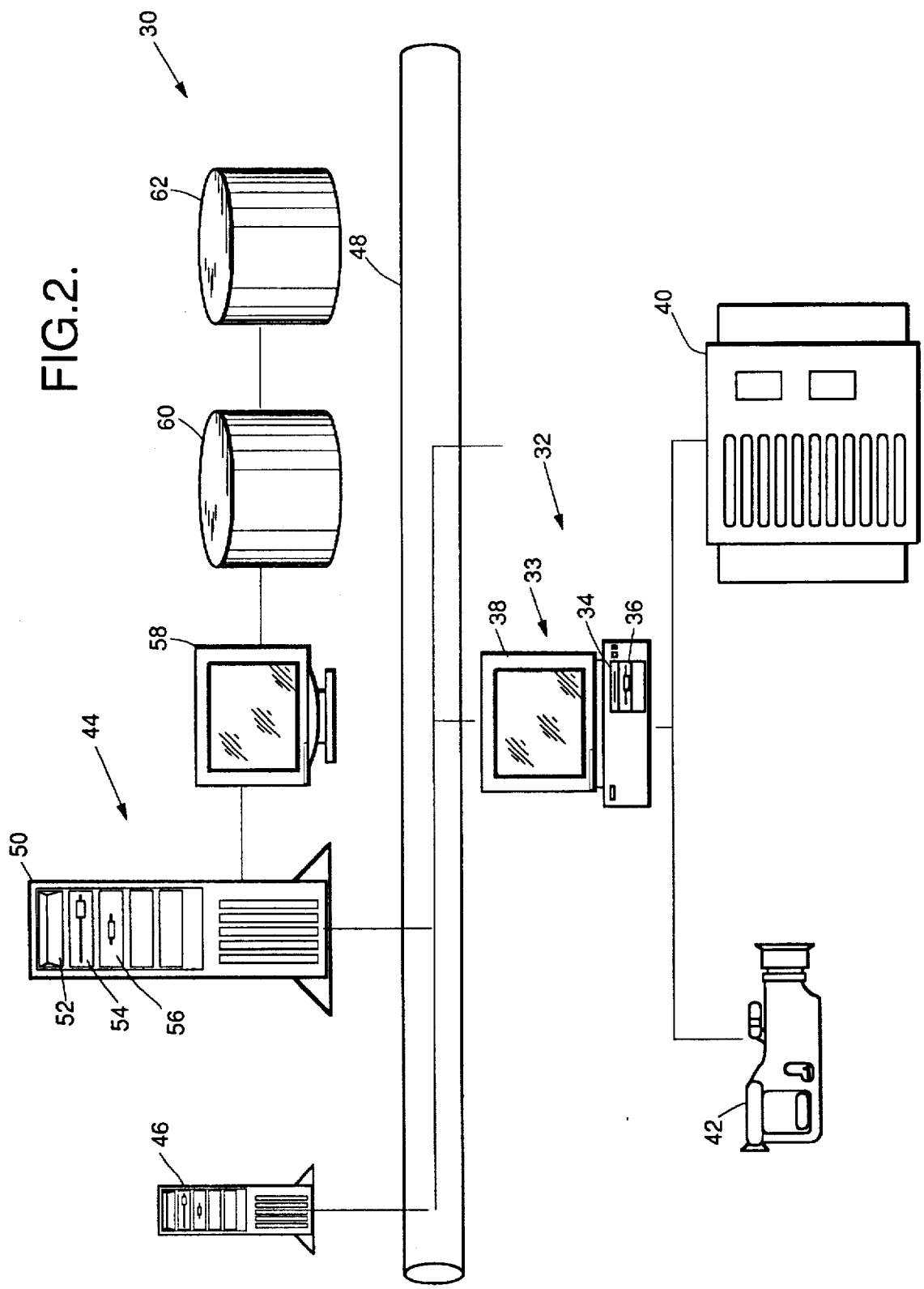
FIG. 2 is a block diagram of an illustrative multimedia network of hardware for use in the practice of the present invention.

FIG. 2 is a block diagram of an illustrative multimedia network of hardware used in the practice of the present invention. The system 30 includes a workstation 32 including conventional personal desktop computer 33 having a hard disk drive 34, a floppy disk drive 36 and a monitor 38 as is common in the art. In practice, the system may include a plurality of workstations, one for each operator. Each workstation that is to receive video has a video card or adapter (not shown) which can receive standard television signals at standard broadcast or cable television frequencies.

The workstation 32 is connected to an offline source of digital data 40 such as a hard disk reader and a laser disc player 42 such as a compact disk (CD) player. Where multiple laser disk players are used, each has a separate frequency or channel. The workstation 32 is connected to a database server 44 and an optional video server 46, via a conventional network 48 such as an Ethernet network. The database server 44 includes a central unit 50 in which a hard disk drive 52, a floppy disk drive 54 and a tape backup unit 56 are disposed. The central unit 50 is connected to a monitor 58. The relational database is represented by a first cylinder 60 and the video table is represented by a second cylinder 62. The database 60 is accessed via the personal computer 33 as discussed more fully below.

Figure 3:
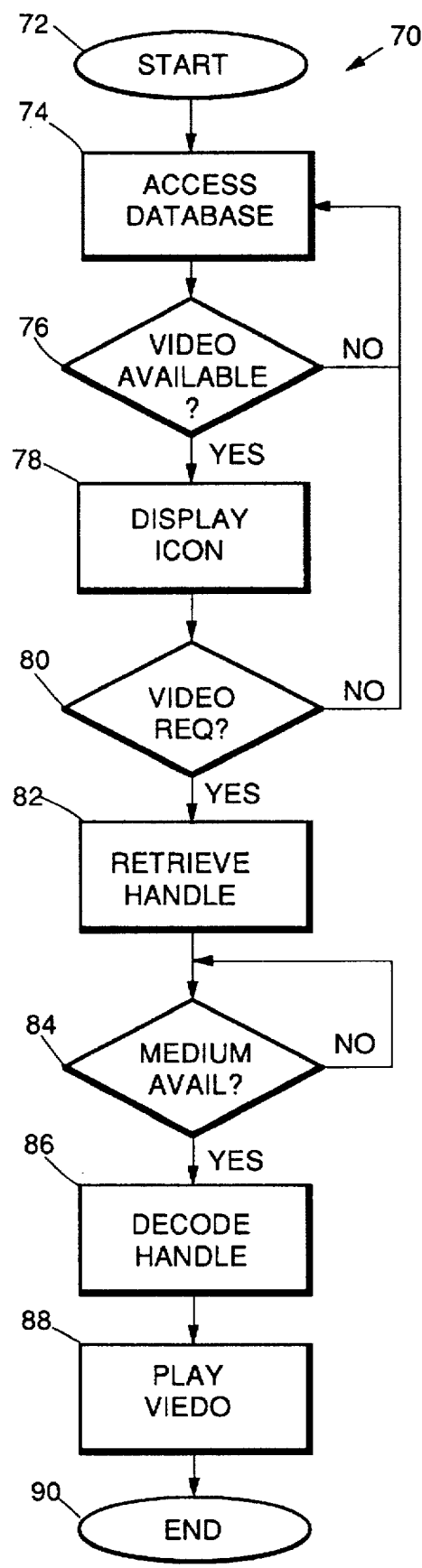
FIG. 3 is an operational flow diagram of the method of the present invention.

FIG. 3 is an operational flow diagram 70 of the method of the present invention. As shown in FIG. 2, when the database 60 is accessed (step 74), the system checks to determine if video is available (at step 76) by reading the table 62 of FIG. 2. If video is available for the selected task narrative, at step 78, an icon is displayed on the screen indicating same. Next, at step 80, the system checks to determine whether the operator has requested the video. If so, at step 82, the handle for the video is retrieved from the video Table ZVIDAA (21) of FIG. 1A. The handle is either interpreted by the database server 44 or sent to the separate optional video server 46, if provided. In either case, at step 84, the system checks to see of the medium (CD or hard disk) on which the video is stored is available. If so, at step 86, the handle is resolved into the address and length of the video for the analog implementation or a file name for the digital implementation.

A "handle" is a generic "pointer" to an object. It can be a descriptive name, a number, or other unique representation. In this case, a descriptive name might be used, such as "1038" Assy Video". This is made the key of a table which is placed into the database for the express purpose of resolving the address and length. In the present analog implementation, the address consists of two parts: the laser disc identification number and the starting frame number of the video in question. These two parts are retrieved from this table as is the length of the video in frames. This information is returned to the workstation which then may query the "video server" as to the availability of that disk. The video server is able to read the identification numbers of the disks in its laser disc players. A mechanism may also be provided by which the video server may signal a human operator when a disk is requested which is not currently located in any of its attached players so that the disk may be located and loaded into one of the players.

If the video resides at the workstation, no network overhead considerations are required and any number of users can access the same video inasmuch as multiple copies exist. If the video resides on a server, one should consider the bandwidth the bandwidth required to maintain acceptable network performance in the presence of the anticipated video loading. A digital video server should be able to allow nonsynchronous simultaneous access to any video so that only one copy need be kept of each file.

The server 44 or 46 then returns the channel number to the workstation 32 which tunes its video adapter (not shown) to the appropriate channel. The video server and workstation then communicate as necessary to allow the operator to interactively play the stored video segment associated with the selected task narrative. The system 30 provides the operator with the ability to play the video frame by frame and to replay it as much as desired.

This may be effected in the following manner. A laser disc player which is compliant to the "random access" features of constant angular velocity (CAV) playback mode can be remotely controlled to play forward from a specified frame, freeze on a specified frame, or play forward or backward at normal, slow or fast speeds. The remote control is effected by means of a serial computer connection from the workstation to the laser disc player. This connection can be direct or it may have a network link interposed. In the most common analog implementation, the serial connection is between the video server and the laser disc player, and the workstation communicates its requirements to the server over the network. This is an extremely low bandwidth communication and it imposes almost no loading on the network (less than 1000 bits/second at a maximum rate of interaction). Conventional laser disc players have useful commands such as "go to frame number 19027" or "advance one frame and pause" or "play backward at half speed". By sequentially transmitting a series of commands, any frame may be selected. The commands are screened by the workstation to make sure that only frames contained in the video being played are seen (the user is prevented from playing past the end or backing up beyond the beginning of the video). When the video is initially selected, the player is commanded to go to the starting frame and play at normal speed to the ending frame, as specified by the starting frame and length obtained from the database, along with the identification number that makes up the complete address of the video.

When the operator is finished, the application on the workstation signals the server which releases the CD player so that it can be accessed by other workstations.

Thus, the present invention has been described herein with reference to a particular embodiment for a particular application. Those having ordinary skill in the art and access to the present teachings will recognize additional modifications applications and embodiments within the scope thereof. For example, the invention is not limited to the offline storage of the video data. The video information may be stored with the data without departing from the scope of the present teachings.

It is therefore intended by the appended claims to cover any and all such applications, modifications and embodiments within the scope of the present invention.

Accordingly,

What is claimed is:

1. A system for providing video on demand from a MIL-STD-1388-2B database of textual information including:

first means for providing said database of textual information;

second means for selectively providing video information at a predetermined address;

third means for storing said address of said video information in said second means in a predetermined location in said data base of text information; and fourth means for selectively displaying video information at said address in said second means.

2. The invention of claim 1 wherein said second means for selectively providing video information is a compact disc.

3. The invention of claim 2 wherein said video information is stored in digital form on said compact disc.

4. The invention of claim 1 wherein said second means for selectively providing video information is a hard disk.

5. The invention of claim 4 wherein said video information is stored as digital data on said hard disk.

6. The invention of claim 1 wherein said third means for storing said address of said video information in said database is a lookup table.

7. The invention of claim 6 wherein said fourth means for selectively displaying said video information at said address in said second means includes means for retrieving said address from said lookup table and using said address to access said second means.

8. The invention of claim 7 wherein said address is encoded within a handle and said fourth means includes means for decoding said handle.

9. The invention of claim 1 wherein said fourth means further includes means for displaying an icon indicating the availability of video when corresponding textual information is displayed.

10. A system for providing video on demand from a MIL-STD-1388-2B database of textual information including:

first means for providing said database of textual information;

second means for selectively providing video information at a predetermined address;

third means for storing said address of said video information in said second means in a predetermined location in said database of text information;

fourth means for displaying an icon indicating the availability of video when corresponding textual information is displayed; and fifth means for selectively displaying video information at said address in said second means, said fifth means.

* * * * *